United States Patent [19]

Fridrich

[11] 3,848,983

[45] Nov. 19, 1974

[54] OPTICAL SYSTEM FOR PROVIDING UNIFORM EXPOSURE OF A PHOTOSENSITIVE SURFACE

[75] Inventor: Elmer G. Fridrich, Chardon, Ohio

[73] Assignee: General Electric Company, Syracuse, N.Y.

[22] Filed: June 23, 1971

[21] Appl. No.: 155,727

[52] U.S. Cl. .................... 95/1 R
[51] Int. Cl. .................... G03b 27/00
[58] Field of Search .................... 95/1; 313/92 B

[56] References Cited

UNITED STATES PATENTS

| | | | |
|---|---|---|---|
| 3,211,067 | 10/1965 | Kaplan | 95/1 R |
| 2,817,276 | 12/1957 | Epstein et al. | 95/1 R |
| 2,936,683 | 5/1960 | Burdick et al. | 95/1 R |

*Primary Examiner*—Richard M. Sheer
*Attorney, Agent, or Firm*—Marvin Snyder

[57] ABSTRACT

A high-intensity lamp which provides a relatively small, intense source of actinic energy with an asymmetrical intensity pattern is oriented so that the higher-intensity energy is directed toward the furthest edges of a photosensitive surface to be irradiated. The lamp is rotated about an axis which extends substantially through the center of the energy source, causing the emitted energy to sweep across the photosensitive surface, exposing the entire surface with energy of substantially uniform intensity.

3 Claims, 2 Drawing Figures

PRIOR ART

PATENTED NOV 19 1974 3,848,983

OPTICAL SYSTEM FOR PROVIDING UNIFORM EXPOSURE OF A PHOTOSENSITIVE SURFACE

BACKGROUND OF THE INVENTION

This invention relates to energy-producing means for irradiating photosensitive surfaces, and more particularly to a system for exposing an extended photosensitive area to a substantially uniform quantity of actinic energy.

In exposing a photosensitive surface to a source of actinic energy, it is necessary that all parts of the photosensitive surface receive substantially the same degree of exposure, corresponding to a relatively uniform amount of applied energy. One way to accomplish this is to use a very large energy source or, equivalently, an optical system which expands or diffuses the apparent source so as to produce actinic energy which impinges upon the various portions of the photosensitive surface with a uniform intensity.

In some applications, however, it is necessary to use an energy source of an exceedingly small size. In particular, when areas of a photosensitive surface are to be exposed through apertures in an opaque mask which is spaced from the surface, the use of a relatively large or diffuse energy source would produce exposed areas having poorly-defined edges. In such situations, it has been found necessary to use a small energy source in order to produce well-defined exposed areas upon the surface.

One area in which this type of process is used is in the deposition of phosphor dots upon the inside of the "screen" or faceplate of a color television tube. As will be understood by those skilled in the art, it is desirable to produce a multiplicity of sets of small, well-defined phosphor dots upon the inside surface of the faceplate, each dot of a set being of a different composition such that it produces a different color when struck by an electron beam. Ordinarily, electron beams are caused to strike predetermined dots of each set through the provision of an apertured shadow mask located behind the faceplate and having one aperture for each set of phosphor dots. The mask, however, is also used in forming the dots in order to maintain the accurate aperture-to-dot registration which is needed for proper operation of the receiver.

In forming the dots, the inside of the faceplate is coated with a photosensitive binder which polymerizes upon reception of sufficient actinic energy. Phosphor is spread upon the binder and adheres thereto, forming a thin layer. Discrete areas of the binder are then exposed through the mask apertures, the exposed portions becoming polymerized. The non-exposed portions are then washed away with a solvent, leaving discrete dots of phosphor-coated binder.

In order to achieve exposed areas having the necessary definition, a small source of actinic energy, approximately a point source, is provided. The source is often constituted by the end of an optical collimator or lightpipe, which emits energy received from a remotely-located arc lamp. It will be appreciated, however, that when such a point source is utilized the areas of the photosensitive binder nearest the source receive energy of a much greater intensity than do other, distant areas. In order to allow a constant intensity of illumination, a graded filter is placed between the light source and the photosensitive surface so as to pass substantially all of the energy directed toward the more distant portions of the surface, while attenuating much of the energy which would ordinarily impinge upon the nearby areas of the surface. The surface as a whole thus receives energy of relatively uniform intensity. It will be apparent, however, that much of the energy is lost because of the presence of the filter. Since the light pipe which is ordinarily used also causes a loss of energy, the energy of the system is quite low, and lengthy exposure times are required.

It will therefore be seen that it would be desirable to provide means for irradiating a photosensitive surface having an apertured mask spaced therefrom, which comprises a relatively small energy source but which exposes substantially the entire surface with radiation of a substantially uniform intensity.

It is therefore an object of the present invention to provide means for applying actinic energy of a substantially uniform intensity over a photosensitive surface.

It is a further object of this invention to provide a system including an energy source having a relatively small size, which will apply energy of a relatively uniform intensity over a photosensitive surface, without interposing filtering means therebetween.

SUMMARY OF THE INVENTION

Briefly stated, in accordance with one aspect of the invention the foregoing objects are achieved by providing a lamp which produces a relatively small, intense source of actinic energy from a short linear arc. The intensity of the energy emitted from the lamp varies asymmetrically about the center of the energy source. The lamp is oriented such that energy of a maximum intensity is directly toward the farthest edges of a photosensitive surface to be exposed. The lamp is then rotated about an axis extending through the apparent center of the energy source, with the lamp being oriented such that the arc is inclined to the axis of rotation in order to direct the most intense energy from the lamp toward portions of the photosensitive surface more distant from the lamp, thereby exposing all points on the surface to substantially the same amount of actinic energy.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which:

DESCRIPTION OF THE PREFERRED EMBODIMENT

Figure 1:
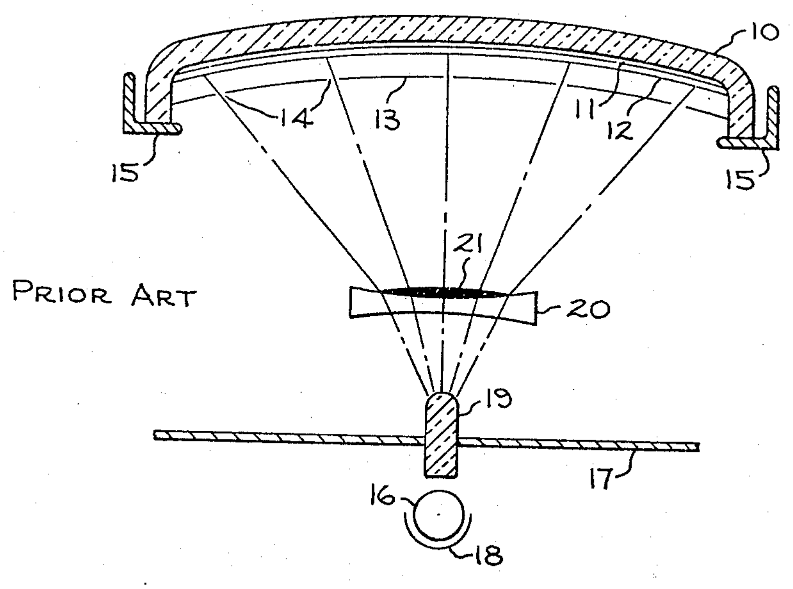
FIG. 1 is an illustration of prior art means for exposing a photosensitive surface through a mask.

Referring now to FIG. 1, there is shown a system for exposing selected areas upon a photosensitive surface, as has heretofore been used. A substrate, shown here as glass faceplate 10, has disposed thereon a layer of photosensitive binder 11. A coating of phosphor 12 is applied to the binder and adheres thereto. An apertured mask 13 is disposed in spaced relationship to the photosensitive surface, the apertures 14 serving to admit radiant energy which exposes the photosensitive binder as will be described hereinafter. For present purposes, such radiant energy will be denominated "actinic" energy, it being understood that the term actinic energy includes any and all types of radiant energy which serve to effect a change in the characteristics of a photosensitive substance.

The faceplate and mask assembly are received in mounting means 15 which maintains the assembly in a desired position. A source of actinic energy such as lamp 16 is disposed beneath an opaque shield 17. Shield 17 is intended to prevent stray energy from impinging upon the photosensitive binder. A reflector 18 may be placed beneath the energy source to recover some of the energy which might otherwise be lost. Actinic energy is directed from the lamp 16 and reflector 18 upwardly toward the bottom or input end of an optical collimator, such as a light pipe 19.

As will be recognized by those skilled in the art, such a light pipe ordinarily has smooth lateral surfaces such that light entering the bottom end thereof is transferred along the light pipe through the mechanism of internal reflection, exiting from the upper end of the pipe which may additionally have a diffuse surface. The dimensions of the diffuse upper end of light pipe 19 are small so that the light pipe end can, for present purposes, be considered a point source. The small size of the effective light source constituted by the end of light pipe 19 is necessary for producing the desired definition of areas of photosensitive binder 11 which are exposed.

A refracting lens 20 may be advantageously disposed between the light source and the mask 13. This lens serves two purposes. Firstly, the lens changes the apparent location of the light source for various ones of the apertures 14 such that actinic energy traverses the apertures at an angle similar to that of deflected electron beams during the subsequent operation of the completed cathode ray tube. Secondly, lens 20 serves to support thereon a graded filter 21. The opaqueness of filter 21 is greatest at the center, and gradually tapers off toward the edges. The opaqueness of the filter is graded to correspond to the distribution of the actinic energy falling upon the photosensitive surface. The filter thus serves to attenuate the actinic energy most in an area toward the center of the filter, such that the portion of the photosensitive surface nearest the energy source is exposed to energy which is of substantially the same intensity as that which exposes more distant portions of the surface. It will be seen that the filter is required to attenuate a substantial portion of the energy emitted by the source, reducing the efficiency of the overall system and necessitating prolonged exposure times in order to allow sufficient actinic energy to impinge upon the photosensitive surface for polymerizing areas thereof.

In carrying out the dot-forming process for which the system shown in FIG. 1 is adapted, a layer of photosensitive binder 11 is applied to the inner surface of faceplate 10. A coating of phosphor, indicated at 12, is then applied over the photosensitive binder such that the phosphor adheres to the binder and forms a thin layer thereupon. After the binder has dried, the coated faceplate is assembled to an apertured mask 13 and the assembly thus constituted is positioned in spaced relationship to a source of actinic energy, such as the upper end of light pipe 19.

After positioning the elements in the desired relationship. lamp 16 is energized and actinic energy emanating from the upper end of light pipe 19 is applied to discrete areas of the phosphor surface through the apertures 14 and in mask 13. When the photosensitive binder has been exposed to suficient energy for polymerizing the exposed areas of the binder, the lamp is de-energized. As is well known to those skilled in the art, the polymerized binder is insoluble in certain solvents which will serve to dissolve unpolymerized photosensitive material. One such solvent is applied to the inner surface of the faceplate 10 and removes the unpolymerized areas of the photosensitive binder along with the phosphor adhering thereto. The exposed, polymerized areas of the binder, and the phosphor adhering thereto, remain upon the inner surface of the faceplate to form discrete dots which correspond in shape and location to the apertures of mask 13. Each phosphor dot, respectively, thus formed constitutes one of a set of dots, respectively to be formed upon the faceplate. Another dot for each of these sets may now be formed by simply repeating the process, re-coating the entire surface including the already-deposited dots with new layers of photosensitive binder and phosphor. By slightly offsetting the faceplate panel from its original position in the mounting means 15, actinic energy traverses the apertures 14 in the mask 13 at a slightly different angle and thus polymerizes portions of the photosensitive binder which lie near the already-deposited dots. A solvent is then re-introduced to remove the unpolymerized binder and phosphor, leaving behind phosphor dots upon the areas of polymerized binder.

In conventional color television receiver tubes, the described process is repeated to form a plurality of sets of three different types of phosphor dots, each type of phosphor producing a different respective color when impinged upon by electrons from the electron gun of the picture tube. The size and definition of each dot so produced reflects characteristics of the optical system, including the actinic energy source. It will therefore be appreciated that in order to supply sufficient actinic energy for adequately polymerizing the photosensitive binder in the presence of the graded filter 21, exposure times must be prolonged in order to insure that areas of the photosensitive binder distant from the actinic energy source are adequately exposed.

Figure 2:
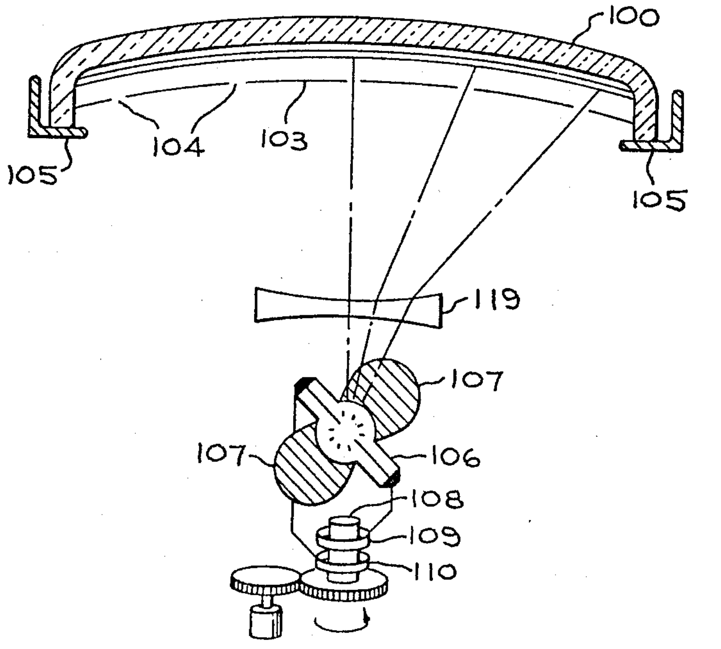
FIG. 2 illustrates one embodiment of the present invention.

FIG. 2 shows one embodiment of the inventive system, which eliminates many of the disadvantages which inhere in the prior art system of FIG. 1. A substrate 100, such as a glass faceplate panel of a cathode ray tube, has disposed thereon a layer of photosensitive binder 101. A layer of phosphor 102 is spread upon the binder, and adheres thereto. An aperture mask 103 is disposed in spaced relationship to the surface of the photosensitive binder, the apertures 104 in the mask serving to define areas of the photosensitive surface which are to be exposed to actinic energy. Mounting means 105 receives the assembly and holds it fixedly throughout the exposure process. A source of actinic energy constituted by arc lamp 106 is disposed in spaced relationship to mask 103, and may advantageously be at substantially the same relative position as the electron gun to be used to energize the phosphor surface. Arc lamp 106 should be a compact, high brightness lamp providing a short, intense, linear arc 112 which for the present purposes may be considered a point source. Such a lamp is described in my U.S. Pat.

application Ser. No. 25,672, filed Apr. 6, 1970, now Pat. No. 3,714,493, and assigned to the assignee of the present patent application.

An arc lamp of the type contemplated for use in the inventive system should have a polar radiation distribution pattern of the familiar round wing shape, illustrated in FIG. 2 by the cross-hatched pattern 107. The lamp is carried upon a rotatable support 108 which may advantageously be fitted with a pair of slip rings 109, 110 for providing current to the lamp from a suitable current source (not shown). Drive means, such as electric motor 111, are coupled to the rotatable support for causing the support and the lamp 106 mounted thereon to rotate at a predetermined rate. A lens 119 may advantageously be disposed between the lamp and mask 103 for modifying the apparent location of the energy source, as described above. A dot-forming process of the type described with respect to FIG. 1 may be performed with the system disclosed in FIG. 2. It will be seen, however, that it is unnecessary to provide any graded filter or other energy attenuating means between lamp 106 and the photosensitive binder. In the illustrated embodiment, it is wished to provide a 90° cone of radiation which should be approximately 20 percent more intense at the outer edge than in the center thereof. These requirements are met by lamp 106, as is described in the above-mentioned copending application, Ser. No. 25,672. The lamp produces an intense spot of radiation less than 0.10 inch in diameter and, when tilted at a 45° angle with respect to the axis of rotation which extends substantially through the center of the arc in the manner shown in FIG. 2, emits energy at a 45° angle to the axis of rotation which is substantially 20 percent more intense than the energy which is emitted along the axis of rotation. As the lamp assembly is rotated, the higher-intensity energy emitted thereby traverses the outer periphery of the photosensitive surface in a relatively rapid manner, while the lower-intensity energy which lies closer to the axis of radiation sweeps across the surface at a correspondingly slower rate. Thus, while the outer edges of the photosensitive surface are swept at a higher rate by the energy source and are more distant from the energy source, these factors are compensated for by the greater intensity of the impingement energy.

By using the lamp described in copending application Ser. No. 25,672 and by dispensing with the graded filter used in the prior art it has been found that the present system provides a tenfold increase in phosphor dot printing speed when compared with the prior system using old-style lamps and filters. It will therefore be seen that the system disclosed provides means for exposing a photosensitive surface with a relatively small energy source, while applying uniform amounts of energy to substantially all of the surface.

As will be evident from the foregoing description, certain aspects of the invention are not limited to the particular details of construction of the example illustrated. It is therefore contemplated that other modifications or applications will occur to those skilled in the art. It is accordingly intended that the appended claims shall encompass all such modifications and applications as do not depart from the true spirit and scope of the invention.

What is claimed as new and desired to be secured by Letters Patent of the United States is:

1. Apparatus for applying actinic energy of substantially uniform intensity to a photosensitive surface, comprising:

lamp means comprising a short linear arc adapted to emit actinic energy; and means for rotating said lamp means with respect to the photosensitive surface about an axis extending substantially through the center of said arc, said lamp means being oriented such that said arc is inclined to the axis of rotation of said lamp means in order to direct the most intense energy from said lamp means toward portions of the photosensitive surface more distant from said lamp means than other portions of the photosensitive surface.

2. A device as defined in claim 1, where said lamp means is a high intensity arc lamp which emits energy from an area therewithin having a diameter of substantially 0.1 inch.

3. A device as defined in claim 2, further including lens means disposed between said lamp means and the photosensitive surface.

* * * * *

Disclaimer 3,848,983.—*Elmer G. Fridrich*, Chardon, Ohio. OPTICAL SYSTEM FOR PROVIDING UNIFORM EXPOSURE OF A PHOTOSENSITIVE SURFACE. Patent dated Nov. 19, 1974. Disclaimer filed Nov. 29, 1974, by the assignee, *General Electric Company*.

Hereby disclaims the term of the patent subsequent to Jan. 29, 1990.

[*Official Gazette July 8, 1975.*]